March 28, 1961 J. PLOTKOWIAK ET AL 2,977,071
HYDRAULIC CONTROL SYSTEM FOR AIRCRAFT
Filed Jan. 20, 1958 2 Sheets-Sheet 2

INVENTOR
JOSEPH PLOTKOWIAK
C.G.D.J. PELISSON
ATTORNEY

2,977,071
HYDRAULIC CONTROL SYSTEM FOR AIRCRAFT

Joseph Plotkowiak, Chatou, and Claude Georges Daniel Julien Pelisson, Paris, France, assignors to Societe d'Exploitation des Materiels Hispano-Suiza, Bois-Colombes, France, a society of France Filed Jan. 20, 1958, Ser. No. 710,069

Claims priority, application France Jan. 23, 1957

3 Claims. (Cl. 244—58)

The present invention relates to hydraulic control systems for use on aircrafts, said systems including at least one hydraulic pump driven by a windmill operated by the relative wind due to the movement of the aircraft in the atmosphere, said pump being intended to feed the hydraulic control system with liquid under pressure, in particular in case of failure of a main hydraulic circuit to which liquid under pressure is normally fed by pump means operated by suitable power and in particular by the engine of the aircraft. Our invention is particularly interesting in the case of systems of the type above described used on aircrafts having a source of electric energy which is of relatively low power and insufficient to feed, in case of emergency, current to an electric motor driving an emergency pump for supplying the hydraulic control system with the liquid under pressure necessary for operating auxiliary devices of the aircraft which are normally operated by the main hydraulic control system.

According to our invention, we provide the system with means for varying the flow rate of the air stream caused by the relative wind to flow through the above mentioned windmill and with means responsive to variations of the delivery rate of flow and pressure of said pump for controlling said air stream flow rate varying means so that the values of said delivery flow rate and said delivery pressure are in a predetermined relation to each other.

A preferred embodiment of the present invention will be hereinafter described with reference to the accompanying drawings, given merely by way of example and in which.

Figure 1:
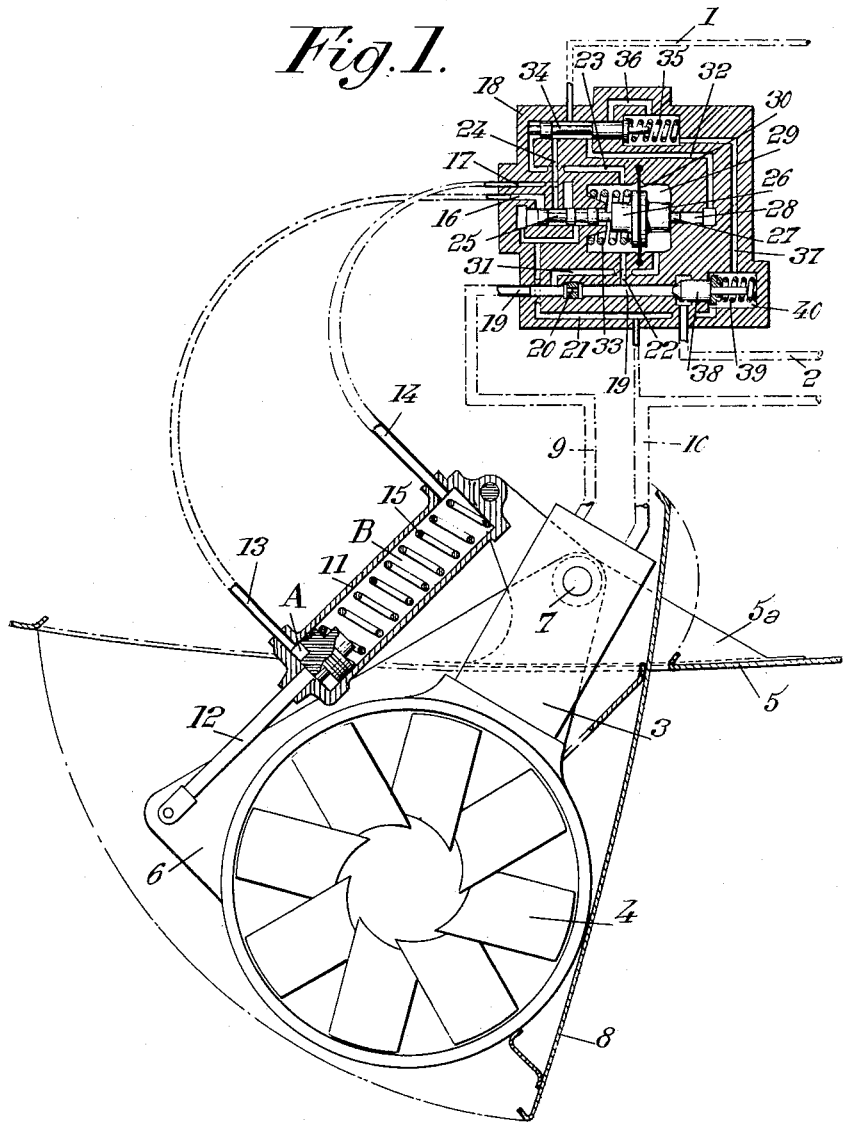
Fig. 1 shows a system according to our invention.

The hydraulic control system illustrated by the drawings includes a main circuit 1 normally supplied with liquid under pressure by a hydraulic pump (not shown) driven for instance by the engine of the aircraft.

The system further includes an emergency circuit 2 intended to be substituted for the main circuit 1 in case of failure thereof due for instance to a breakdown of the aircraft engine, said emergency circuit 2 being supplied with liquid under pressure by a hydraulic pump 3 driven by a windmill 4 arranged so that it can be placed in the relative wind produced by the movement of the aircraft.

These two hydraulic control circuits serve to operate elements of the aircraft and in particular the aerodynamic control surfaces thereof.

It should be noted that when the aircraft is flying at low speed, these control surfaces oppose but a small resistance to their displacement but must be given displacements of relative great amplitude so that the pump must supply a high rate of flow of liquid under a relatively low pressure.

On the contrary, when the aircraft is flying at high speed, the resistance of the control surfaces to their displacement is high, but the displacements themselves are of relatively low amplitude, so that the pump should then supply a relatively low flow rate of liquid at a high pressure.

This shows that the unit constituted by the pump and the windmill by which it is driven must have different conditions of operation, according to the conditions of flight of the aircraft.

For this purpose, our system comprises means for varying the flow rate of the air stream caused by the relative wind to flow through said windmill and means responsive to variations of the delivery rate of flow and the delivery pressure of said pump for controlling said air stream flow rate varying means so that the values of said delivery flow rate and said delivery pressure are in a predetermined relation to each other. This relation may be discontinuous but it is preferably continuous.

The windmill 4 which drives the liquid pump 3 may be mounted in fixed position on the aircraft structure 5 and the above mentioned means would be means for shielding said windmill more or less against the relative wind. However we have found that it is preferable to vary the flow rate of the air stream passing through the windmill by mounting said windmill 4 in such manner that it can be shifted from an active position (shown by Fig. 1), where it is wholly exposed to the action of the relative wind, to an inactive position in which it is retracted in the aircraft structure 5, the flow rate of the air stream that passes through the windmill thus varying gradually from a maximum value to a value equal to zero when the windmill passes from its active position to its inactive or retracted position.

As shown by the drawings, the whole of windmill 4 and pump 3 is mounted on a support 6 capable of pivoting about an axis 7 journalled in a part 5a rigid with respect to the aircraft structure 5. Preferably, said support 6 also carries a panel 8 intended to clase the gap formed in the wall of the aircraft structure when the windmill is made to project from the housing provided for this purpose in said aircraft structure.

Advantageously, pump 3 is arranged so as to extend radially with respect to windmill 4 and to its casing and pivot axis 7 is mounted near the free end of pump 3, said axis advantageously serving to ensure a hydraulic connection between said pump on the one hand, and a delivery conduit 9 and a suction conduit 10 on the other hand.

It should be noted that if the liquid delivered by the pump is made to flow out from axis 7 and in the direction of the relative wind, there is obtained a reaction which reduces the stress on the axial abutment thrust bearing due to the fact that windmill 4 is subjected to the action of the relative wind.

Control means, and preferably hydraulic means, are provided to make it possible to pivot the oscillating support 6 so as to expose windmill 4 more or less to the action of the wind. Such means may be constituted, as shown by the drawings, by a double action hydraulic jack 11 the cylinder of which is pivoted to the structure 5 of the aircraft and the rod 12 of which is pivoted to support 6. The pressure chambers A and B of said jack are connected, respectively through two conduits 13 and 14, with the regulation device proper which will be hereinafter described and which is intended to control, through jack 11, the position of windmill 4 with respect to the aircraft.

Preferably, a spring or the like 15 is provided to urge support 6 toward the outer position thereof.

The regulation device is preferably arranged in such manner as to compel windmill 4 to take a position where its power characteristic is such that the delivery flow rate Q and the delivery pressure P of pump 3 are constantly in a relation to each other such as:

$$K_1 Q^2 + K_2 P = K_3$$

in which $K_1$, $K_2$ and $K_3$ are constant coefficients.

In the embodiment illustrated by Fig. 1, conduits 13 and 14 lead to two passages 16 and 17 provided in the body 18 of the regulation device; delivery conduit 9 of pump 4 leads to a passage 19 communicating, with the interposition of a throttled passage 20, with the emergency circuit 2; the suction conduit 10 of pump 4 is connected with a conduit 21 intended to collect the liquid leaks in the regulation device; the portion of passage 19 located downstream of the throttled portion 20 thereof is connected, through conduits 22, 23 and 24, with the distribution chamber of a regulating valve 25. This valve, according to the position it occupies, connects the pressure inlet conduit 24 either with the conduit 13 of the jack, the conduit 14 of said jack being then placed in communication with the discharge conduit 21, or with the conduit 14 of the jack, the conduit 13 thereof being then placed in communication with said discharge conduit 21; the regulating slide valve 25 is rigid with a push-piece 26 guided, on the side opposed to said slide valve 25, by means of a cylindrical finger 27 engaged with a sliding fit in a cylindrical recess 28 of a cross-section $s_1$ smaller than the cross-section $s_2$ of said regulating slide valve 25; push-piece 26 is mounted in a chamber 29 and said push-piece is connected with the wall of said chamber through diaphragm 30 which divides said chamber into two compartments one of which (on the left hand side of Fig. 1) forms a communication between conduits 22 and 23 and is therefore at a pressure equal to that existing downstream of the throttled passage 20. The other compartment (on the right hand side of diaphragm 30) is connected, through a conduit 31, with the portion of passage 19 located upstream of said throttled portion 20 and is therefore at a pressure equal to the delivery pressure P of pump 3; cylindrical recess 28 is connected with the leak conduit 21, for instance through a conduit 32 in communication with other conduits (36, 37 and chamber 40) which will be hereinafter more fully mentioned; push-piece 26 is further subjected to the action of a spring 33 which urges it toward the right, i.e. toward the direction which causes a windmill to project from its housing in the aircraft structure.

Furthermore, means are provided for automatically cutting off the main circuit 1 and bringing the emergency circuit 2 into action when the pressure in said main circuit drops below a predetermined value (for instance 150 kg./sq. cm.). For this purpose, the main circuit 1 co-operates with the regulation device in such manner that said circuit is connected with the distribution chamber of a slide valve 34 subjected to the action of a spring 35 urging it toward an end position (such as shown by Fig. 1) where conduit 23 is separated from conduit 24 and conduit 32 is connected with conduit 24 and with the main circuit 1. The other end position of said slide valve 34 restores the communication between conduits 23 and 24 and places conduit 32 in communication with discharge conduit 21 through conduits 36 and 37, the outlet of the main circuit 1 toward the regulation device being cut off for this last mentioned position of slide valve 34.

Finally we provide on the passage 19 connected with pump 4, downstream of the throttled passage 20 and of the pressure conduit 22, a closing valve 38 loaded for instance by a spring 39 housed in a chamber 40 which connects conduits 37 and 21 together, said valve maintaining in the regulation device proper a pressure sufficient to permit its operation whatever be the pressure in the emergency circuit 2 (which pressure depends in particular upon the requirements in liquid under pressure of the annexed devices operated by said emergency circuit).

The system above described works as follows:

It will first be supposed that the aircraft is on the ground and its engine is stopped. In this case, illustrated by Fig. 1, pump 3 and windmill 4 carried by support 6 are on the outside of the aircraft structure under the only action of spring 15, since circuits 1 and 2 are not under pressure. When the aircraft engine is started, the main circuit 1 is placed under pressure and its pressure is applied to the push-piece element 27 through conduit 32 and chamber 28. The chamber B of jack 11 is also subjected to this pressure through conduits 24 and 17 and conduit 14, whereas the chamber A of said jack is placed at the inlet pressure (that is to say the pressure existing in conduit 10 and conduit 21) through conduit 13 and conduits 16 and 21. When the pressure in the main circuit reaches the above mentioned predetermined value, which may be for instance 150 kg./sq. cm., finger 27 moves the whole of push-piece 26 and slide valve 25 toward the left. This places the pressures inlet conduit 24 in communication with conduit 16, conduit 13 and chamber A of jack 11, thus transmitting the pressure of the main circuit 1 to said chamber A. Furthermore, the chamber B of the jack is placed in communication with conduit 14, conduit 17 and discharge conduit 21. Jack 11 then compels the pump and windmill to retract into the aircraft structure.

If, at any time after this, the pressure in the main circuit 1 drops below the above mentioned minimum value, for instance 150 kg./sq. cm., spring 33 pushes slide valve 25 toward the right, that is to say into the position of Fig. 1. This means that on the one hand the pressure of the main circuit is transmitted to the chamber B of the jack, and on the other hand the chamber A of the jack is placed in communication with the discharge conduit 21. Therefore jack 11 compels the windmill and pump to project to the outside of the aircraft structure.

Figure 3:
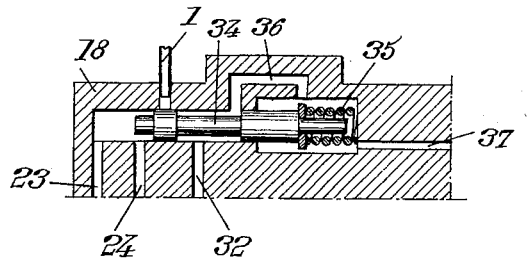

Windmill 4 is then operated by the relative wind and pump 3 starts feeding liquid under pressure into conduit 9 and thence into conduit 19. Emergency circuit 2 is fed with liquid under pressure and the two faces of diaphragm 30 are subjected respectively to pressure P (on the right hand side) and to pressure $P-dP$ (on the left hand side), $dP$ being the pressure drop caused by the throttled passage 20. Pressure $P-dP$ which exists downstream of said throttled passage 20 is transmitted, through conduits 22 and 23, to slide valve 34 which is then pushed toward the right against the action of spring 35, as shown by Fig. 3. In this new position, slide valve 34 closes the communication between the main circuit 1 and the regulation device and connects conduits 23 and 24 together, thus causing the operation of jack 11 to be taken in charge by the unit constituted by windmill 4 and pump 3. Furthermore, conduit 32 is connected with delivery conduit 21 through conduits 36 and 37.

If S is the area of the cross-section of cylindrical chamber 29, and if P is the difference between the pressure existing in said chamber on the right hand side of diaphragm 30 and the leak pressure acting on cylindrical projection 27 (of cross-sectional area equal to $s_1$), the force acting on member 25—26 toward the left is $P(S-s_1)$. The difference between the pressure existing in chamber 29 on the left hand side of diaphragm 30 and the same leak pressure acting on the left hand end of slide valve 25 (of cross-sectional area equal to $s_2$) is $P-dP$, $dP$ being the pressure drop produced by the throttled passage 20. Therefore the pressure force acting on member 25—26 toward the right is $(P-dP)(S-s_2)$. The force R of spring 33 also acts on member 25—26 toward the right. Since these three forces balance one another, when member 25—26 is in the position of Fig. 2, $$P(S-s_1)-(P-dP)(S-s_2)-R=0$$

i.e.

$$PS-Ps_1-PS+dPS+Ps_2-dPs_2-R=0$$

or $$(S-s_2)dP+P(s_2-s_1)=R$$

Now the pressure drop $dP$ is proportional to the square of the delivery rate Q of pump 3.

Therefore $$k(S-s_2)Q^2+P(s_2-s_1)=R$$

This formula therefore corresponds to a relation of the form:

$$k_1 Q^2 + k_2 P = k_3$$

When the respective values of Q and P lead to values of the efforts transmitted by diaphragm 30 lower than the force R of spring 33, regulation slide valve 25 is moved by said spring toward the right so that conduit 17 is placed in communication with the delivery of pump 3, whereas conduit 16 is placed at the leak pressure. This causes the windmill to project to a greater degree from the aircraft structure until the hydraulic power that is supplied again complies with the condition of equilibrium and regulation slide valve 25 comes back into neutral position where jack 11 is fixed.

Figure 2:
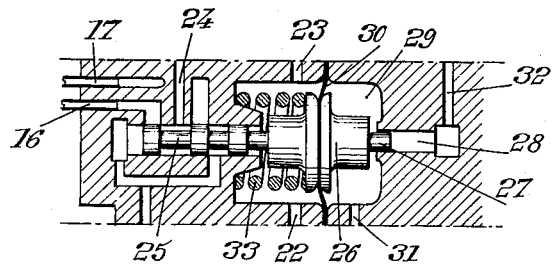
Figs. 2 and 3 show some positions occupied by valve means of said system during the operation thereof.

When the respective values of Q and P lead to a value of the efforts transmitted by diaphragm 30 higher than the effort R of spring 33, slide valve 25 is moved by said diaphragm toward the left so that conduit 16 is placed in communication with the delivery of pump 3 and conduit 17 is placed at the suction pressure. The windmill is then caused to retract slightly until the hydraulic power that is supplied again complies with the condition of equilibrium and slide valve 25 comes back into neutral position (Fig. 2).

The spring loaded valve shown at 38 maintains, upstream thereof, a pressure sufficient for the operation of the jack which controls the positions of windmill 4 even in case of low pressures in emergency circuit 2. However the opening of said valve 38 is complete for a value of the pressure $P - dP$ little higher than the pressure at the beginning of opening, so that the pressure drop is as low as possible.

In a general manner, while we have, in the above description, disclosed what we deem to be practical and efficient embodiments of our invention, it should be well understood that we do not wish to be limited thereto as there might be changes made in the arrangement, disposition and form of the parts without departing from the principle of the present invention as comprehended within the scope of the accompanying claims.

What we claim is:

1. A system for feeding the hydraulic control system of an aircraft, said system comprising: a windmill mounted on said aircraft and movable to a plurality of positions between two end positions, one of said end positions being one where most of the surface of said windmill is exposed to the airstream of the aircraft and the other of said end positions being a retracted position where said windmill is shielded against the airstream, a liquid pump driven by said windmill, means for connecting the output of said pump with the hydraulic control circuit of the aircraft, means for varying the position of said windmill between said two end positions, and valve means connected with said hydraulic control circuit for controlling said windmill position varying means in response to variations of the delivery rate of flow and delivery pressure of said pump.

2. An emergency hydraulic system for use on an aircraft having a main hydraulic control circuit, said system comprising: a windmill mounted on said aircraft and movable to a plurality of positions between two end positions, one of said end positions being one where most of the surface of said windmill is exposed to the airstream of the aircraft and the other of said end positions being a retracted position where said windmill is shielded against the airstream, a liquid pump driven by said windmill and connected to an emergency hydraulic circuit, hydraulic means for varying the position of said windmill between said two end positions, valve means responsive to variations of the delivery rate of flow and delivery pressure of said pump for controlling said hydraulic position varying means, said hydraulic means being normally in communication with the main hydraulic control circuit of the aircraft and adapted to hold said windmill in said retracted position under the effect of pressure in said main hydraulic control circuit, and means responsive to a drop of said last mentioned pressure below a predetermined minimum valve for cutting off communication between said hydraulic means and said main hydraulic control circuit.

3. A system according to claim 2 including a yielding resiliently loaded valve in the portion of said emergency circuit downstream from the output of said pump for maintaining a pressure equal to a predetermined value in said circuit between said output and said valve.

References Cited in the file of this patent

UNITED STATES PATENTS

| | | |
|---|---|---|
| Re. 24,179 | Breaux | July 10, 1956 |
| 2,688,285 | Stockett | Sept. 7, 1954 |